(12) United States Patent
Johnson et al.

(10) Patent No.: US 10,479,194 B1
(45) Date of Patent: Nov. 19, 2019

(54) OVER FENDER AIR GUIDE AND SNORKEL PROTECTION

(71) Applicant: Honda Motor Co., Ltd., Tokyo (JP)

(72) Inventors: Samira S. Johnson, Dublin, OH (US); Dane R. Marsack, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/154,013

(22) Filed: Oct. 8, 2018

(51) Int. Cl.
  *B60K 13/02* (2006.01)
  *F02M 35/16* (2006.01)
  *B60K 13/06* (2006.01)

(52) U.S. Cl.
  CPC .............. *B60K 13/02* (2013.01); *B60K 13/06* (2013.01); *F02M 35/162* (2013.01); *B60Y 2200/20* (2013.01)

(58) Field of Classification Search
  CPC .... B60K 13/02; B60K 13/06; B60Y 2200/20; F02M 35/162
  See application file for complete search history.

(56) References Cited

U.S. PATENT DOCUMENTS

| | | | |
|---|---|---|---|
| 5,195,484 A | 3/1993 | Knapp | |
| 5,947,219 A | 9/1999 | Peter et al. | |
| 6,314,931 B1 * | 11/2001 | Yasuda | F02B 61/02 123/184.53 |
| 6,732,830 B2 | 5/2004 | Gagnon et al. | |
| 6,959,934 B2 | 11/2005 | Rioux et al. | |
| 7,040,437 B1 | 5/2006 | Frederickson et al. | |
| 7,163,073 B2 | 1/2007 | Schmid et al. | |
| 8,210,297 B2 | 7/2012 | Kalisz et al. | |
| 8,960,347 B2 * | 2/2015 | Bennett | B60K 13/02 180/68.3 |
| 2006/0065231 A1 * | 3/2006 | Nozaki | B60K 13/02 123/198 E |
| 2007/0012274 A1 * | 1/2007 | Kawatani | F02M 35/10013 123/184.21 |
| 2012/0152632 A1 * | 6/2012 | Azuma | F02M 35/162 180/68.3 |
| 2014/0102818 A1 * | 4/2014 | Hirukawa | F02M 35/162 180/68.3 |
| 2016/0176284 A1 * | 6/2016 | Nugteren | B60K 13/04 180/309 |
| 2018/0009500 A1 | 1/2018 | Lovold et al. | |

FOREIGN PATENT DOCUMENTS

CN 201566581 U 9/2010

* cited by examiner

*Primary Examiner* — Brian L Swenson
(74) *Attorney, Agent, or Firm* — Honda Patents & Technologies North America, LLC; Mark E. Duell

(57) ABSTRACT

An air intake system for supplying air to a snorkel of a vehicle includes a lower air intake vent having an opening defining a lower air pathway to the snorkel, and a scoop disposed in the lower air intake vent. The scoop has a base portion attached to a body component in the lower air pathway, a longitudinally transverse portion extending forward from the base portion, and a laterally transverse portion extending from an upper edge of the base portion and an upper edge of the longitudinally transverse portion. The air intake system further includes an upper air intake vent having an upper opening in a fender body panel vertically above the wheel well, the upper air intake vent defining an upper air pathway to the snorkel, and a snorkel protection flange extending downwardly from an inner surface of the fender body panel.

19 Claims, 12 Drawing Sheets

OVER FENDER AIR GUIDE AND SNORKEL PROTECTION

TECHNICAL FIELD

The embodiments described herein are related to air intake systems for motor vehicles, such as those known as side-by-side utility vehicles.

BACKGROUND

In the past, air intake systems for motor vehicles such as side-by-side utility vehicles, with rear-placed engines used a ducted air intake covered by a water resistant membrane as a pre-filter. While the membrane would reduce the amount of water and debris that may enter the intake system, the membrane could be clogged, preventing air from entering the air intake. Therefore, there is a need for an air intake system that prevents air and debris from entering the air intake system.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an air intake system for supplying air to a snorkel of a vehicle is disclosed. The vehicle includes a wheel well, a wheel disposed in the wheel well, a first body panel defining a side of an engine compartment of the vehicle, and a second body panel attached to the first body panel and located above and defining the wheel well. The air intake system includes a first air intake vent having a first opening and a snorkel located underneath the second body panel defining a first air pathway to the snorkel, and a scoop disposed in the first air intake vent, wherein air entering the first air intake vent passes the scoop and follows the first air pathway to the snorkel.

According to still another aspect, the scoop has a base portion attached to a body component defining a back wall of the lower air intake vent, a longitudinally transverse portion extending forward from the base portion, and a laterally transverse portion extending from an upper edge of the base portion and an upper edge of the longitudinally transverse portion.

According to another aspect, an air intake system for supplying air to a snorkel of a vehicle is disclosed. The vehicle includes a wheel well, a wheel disposed in the wheel well, a first body panel defining a side of an engine compartment of the vehicle, and a second body panel attached to the first body panel and located above the wheel well. The air intake system includes a first air intake vent having a first opening in the second body panel vertically above the wheel well, the first air intake vent defining a first air pathway to the snorkel, and a snorkel protection flange extending downwardly from an inner surface of the second body panel.

According to yet another aspect, an air intake system for supplying air to a snorkel of a vehicle is disclosed. The vehicle includes a wheel well, a wheel disposed in the wheel well, a rear quarter body panel defining a side of an engine compartment of the vehicle, and a fender body panel attached to the rear quarter body panel and located above the wheel well. The air intake system includes a lower air intake vent having a first opening defining a lower air pathway to the snorkel, a scoop disposed in the lower air intake vent, the scoop having a base portion attached to a body component in the lower air pathway, a longitudinally transverse portion extending forward from the base portion, and a laterally transverse portion extending from an upper edge of the base portion and an upper edge of the longitudinally transverse portion. The air intake system further includes an upper air intake vent having an upper opening in the fender body panel vertically above the wheel well, the upper air intake vent defining an upper air pathway to the snorkel, and a snorkel protection flange extending downwardly from an inner surface of the fender body panel.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
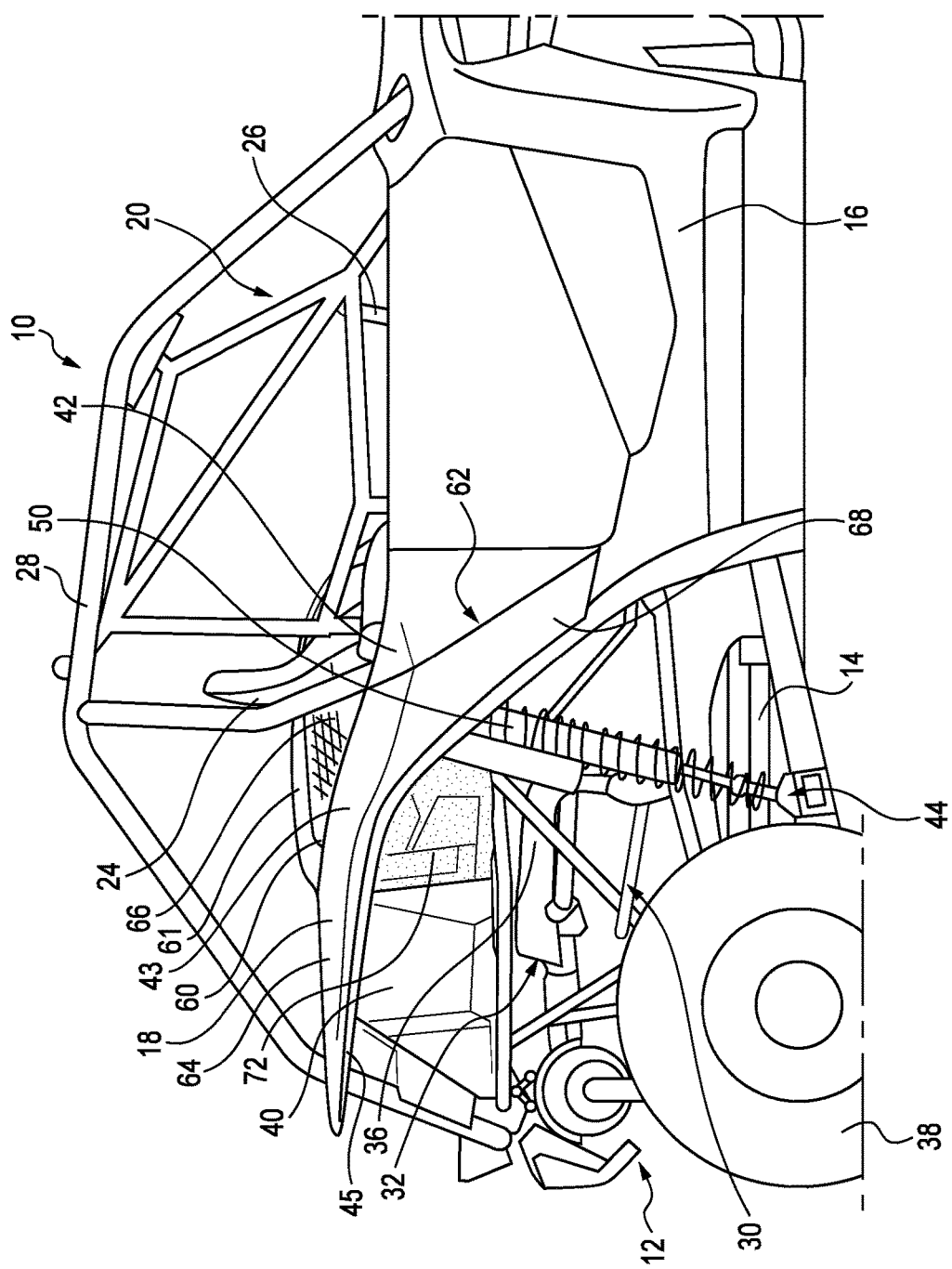
FIG. 1 is a side view of a rear quarter of a motor vehicle typically described as a side-by-side utility vehicle.
Figure 2:
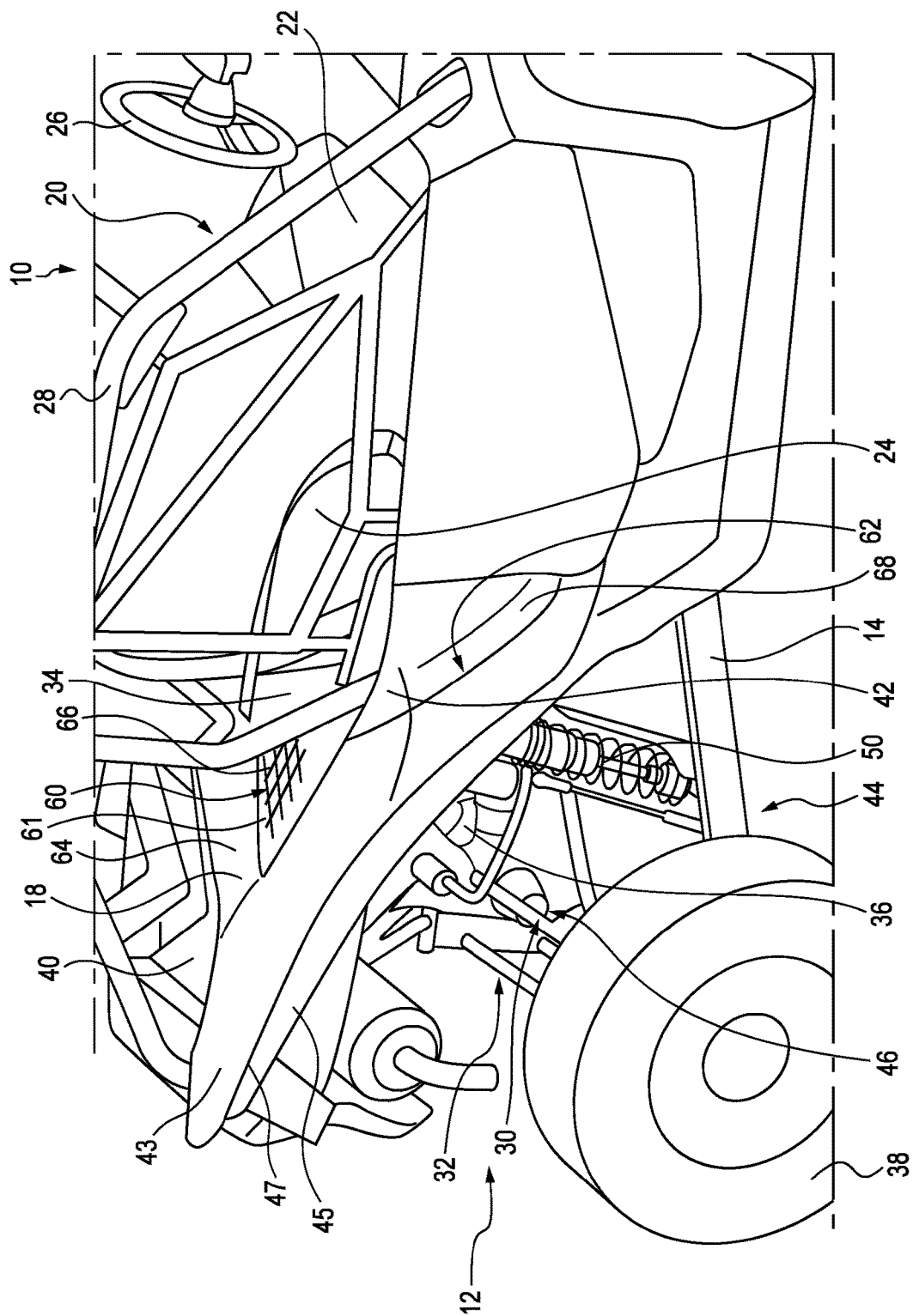
FIG. 2 is a top and side perspective view of the motor vehicle of FIG. 1.
Figure 3:
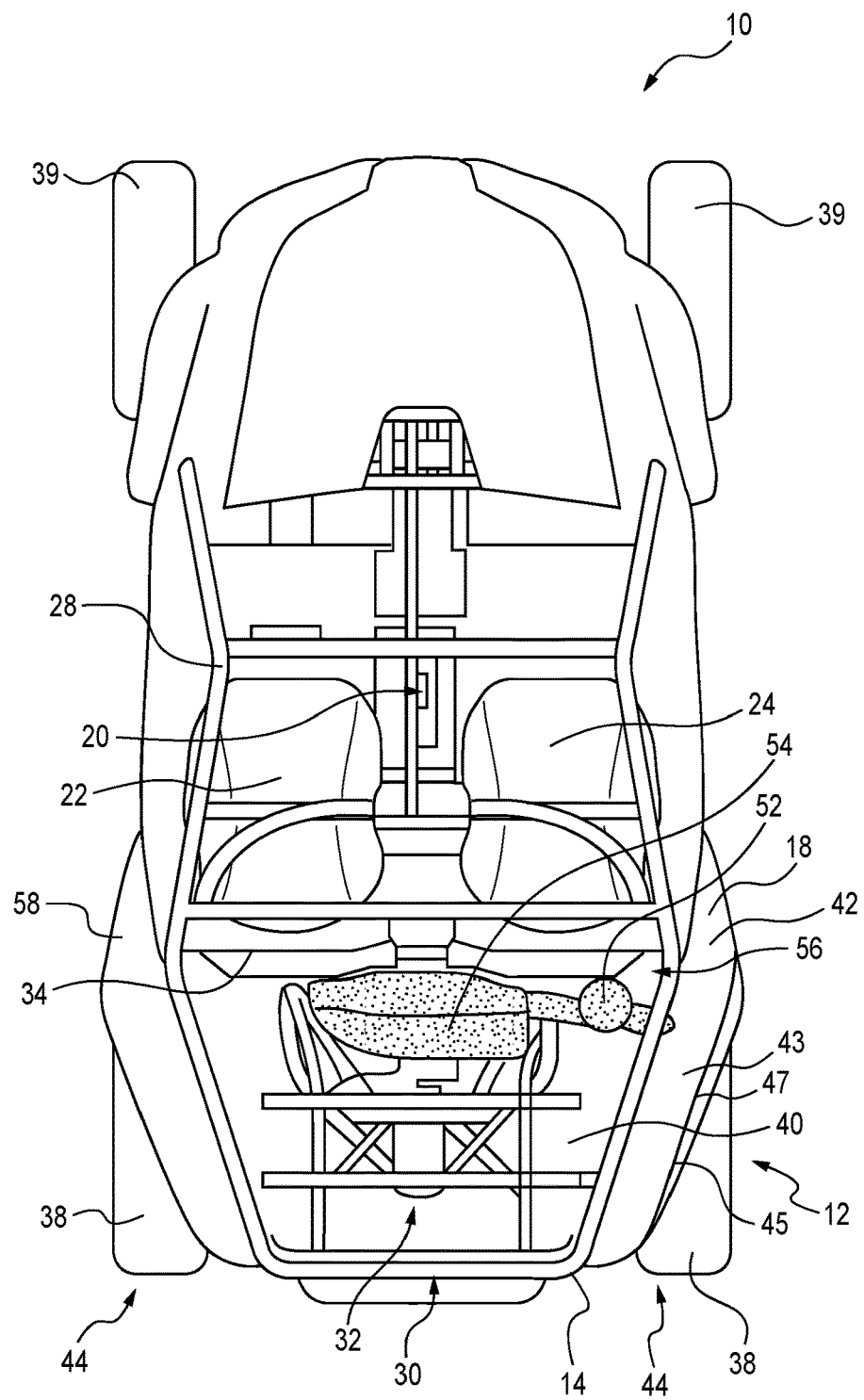
FIG. 3 is a top view of the motor vehicle of FIG. 1.

FIGS. 1-12 illustrate views of portions of a motor vehicle 10. FIG. 1 illustrates the rear quarter 12 of the motor vehicle 10, FIG. 2 illustrates a top perspective view of the rear quarter 12 of the motor vehicle 10, and FIG. 3 illustrates a top view of the motor vehicle 10. The motor vehicle 10 illustrated in FIGS. 1-12 is of the type typically described as a side-by-side utility vehicle. The motor vehicle 10 includes a frame 14 and a body 18 on the frame 14. A first portion 16 of the frame 14 and the body 18 defines a passenger cabin 20, which includes a driver seat 22, a passenger seat 24, a steering wheel 26, and a roll cage 28 for protecting the users of the motor vehicle 10. A second portion 30 of the frame 14 and the body 18 defines an engine compartment 32 that is located longitudinally rearward of the passenger cabin 20. A firewall 34 separates the passenger cabin 20 from the engine compartment 32. An engine 36 is attached to the frame 14 in the engine compartment 32. The motor vehicle 10 also includes two rear wheels 38 driven by the engine 36 and two front wheels 39 steerable by a driver sitting in the driver seat 22 by using the steering wheel 26. Finally, the motor vehicle 10 may include a bed 40 located longitudinally rearward of the passenger cabin 20 and vertically above the engine compartment 32. In an alternative embodiment, a second row of passenger seats may replace the bed 40.

The body 18 includes a rear quarter body panel 42 that covers a portion of the engine compartment 32 and a fender body panel 43 and defines a wheel well 44, which is an open area in the body 18 in which each rear wheel 38 is free to move. The body 18 may further include a fender 45 extending from a distal edge 47 of the fender body panel 43 that further defines the wheel well 44. In the motor vehicle 10 of the type illustrated, the vehicle suspension system 46, which includes a shock absorber or strut 50, provides for a wide range of motion of the rear wheel 38 to support off-road usage of the motor vehicle 10. Because the motor vehicle 10 is designed to be used off-road, the rear wheels 38 may generate or kick up dust, dirt, rocks, snow, and other types of the debris in the wheel well 44.

Because the engine 36 of the motor vehicle 10 is located behind the firewall 34 that defines the forward-most portion of the engine compartment 32, there is need to direct clean, ambient air flow to the engine 36 for purposes of supporting proper air-fuel mixing and combustion within the engine 36. In order to support proper air flow, a snorkel 52 extends from the air cleaner 54 of the engine 36, which cleans and directs air to the engine 36, to an air intake compartment 56 located behind the rear quarter body panel 42 of the body 18. In the embodiment illustrated in FIGS. 1-3, the air intake compartment 56 is located behind the right rear quarter body panel 42. In an alternate embodiment, the air intake compartment 56 could alternatively be located behind the left rear quarter body panel 58.

Figure 4:
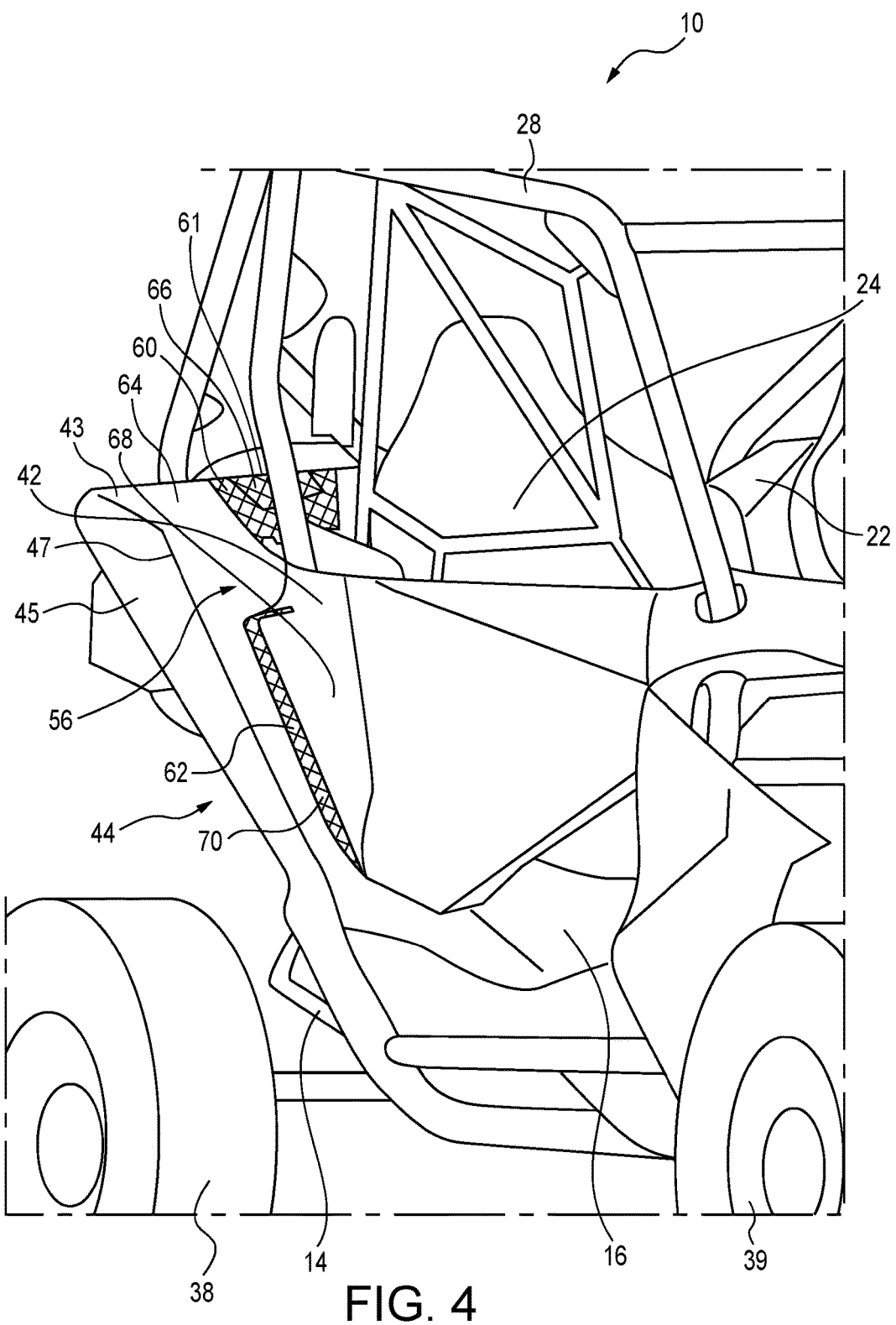
FIG. 4 is a front perspective view of the motor vehicle of FIG. 1 illustrating one embodiment of a lower air intake vent.
Figure 5:
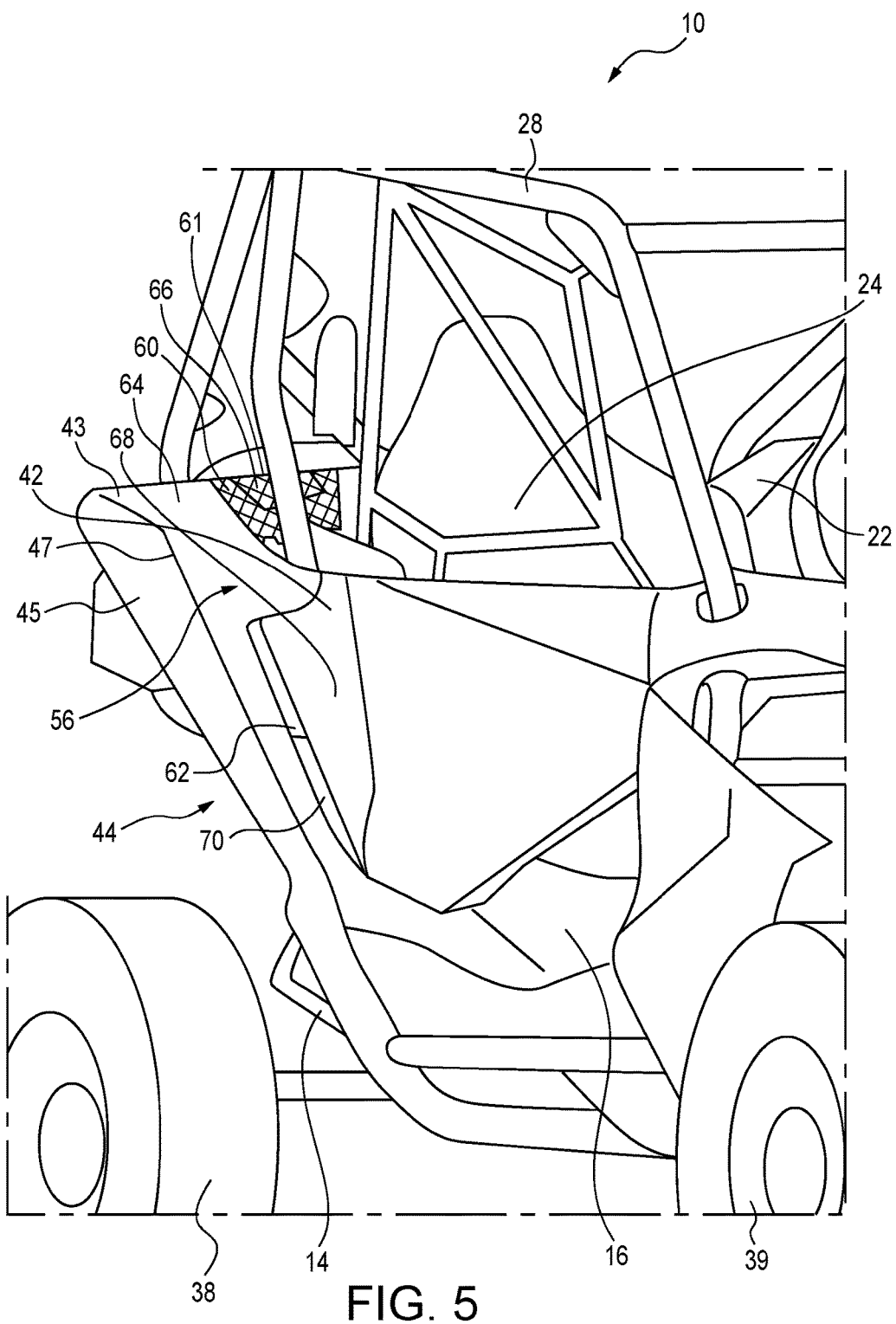
FIG. 5 is a front perspective view of the motor vehicle of FIG. 1 illustrating another embodiment of the lower air intake vent.

FIGS. 4-5 illustrate the upper and lower air intake vents 60, 62 in greater detail. Within the fender body panel 43, there is located an upper air intake vent 60 for directing the flow of air from outside the motor vehicle 10 into the air intake compartment 56. The upper air intake vent 60 includes a trapezoidal shaped opening 61 within an upper portion 64 of the fender body panel 43. A mesh cover 66 may be affixed in the opening 61 to prevent the introduction of debris such as rocks, larger chunks of dirt, and the like, into the air intake compartment 56.

A lower air intake vent 62 for directing the flow of air from outside the motor vehicle 10 into the air intake compartment 56 is located between a lower portion 68 of the rear quarter body panel 42 and the fender body panel 43. The lower air intake vent 62 also may include a mesh cover 70, as illustrated in FIG. 4 to prevent the introduction of debris, or as illustrated in FIG. 5 may be free of the mesh cover 70 illustrated in FIG. 4.

Figure 6:
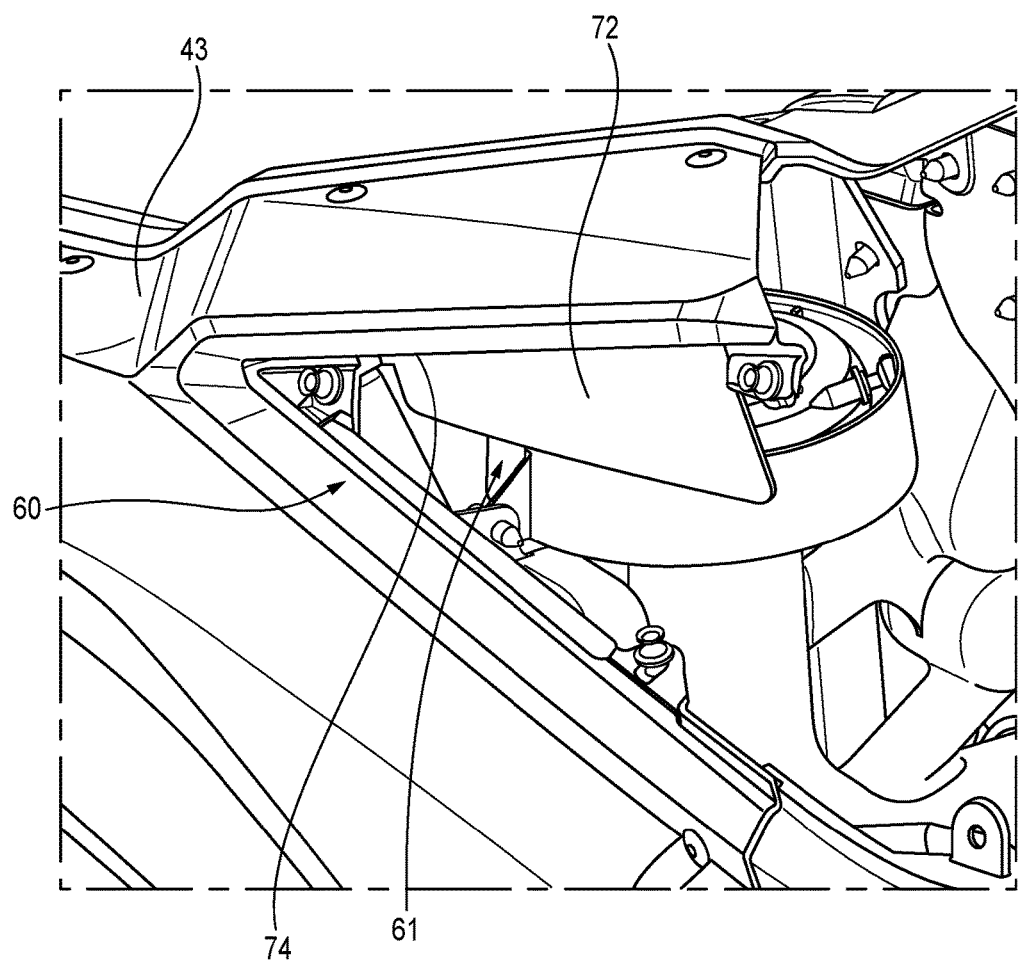
FIG. 6 is a side perspective view of an upper air intake vent of the motor vehicle of FIG. 1.
Figure 7:
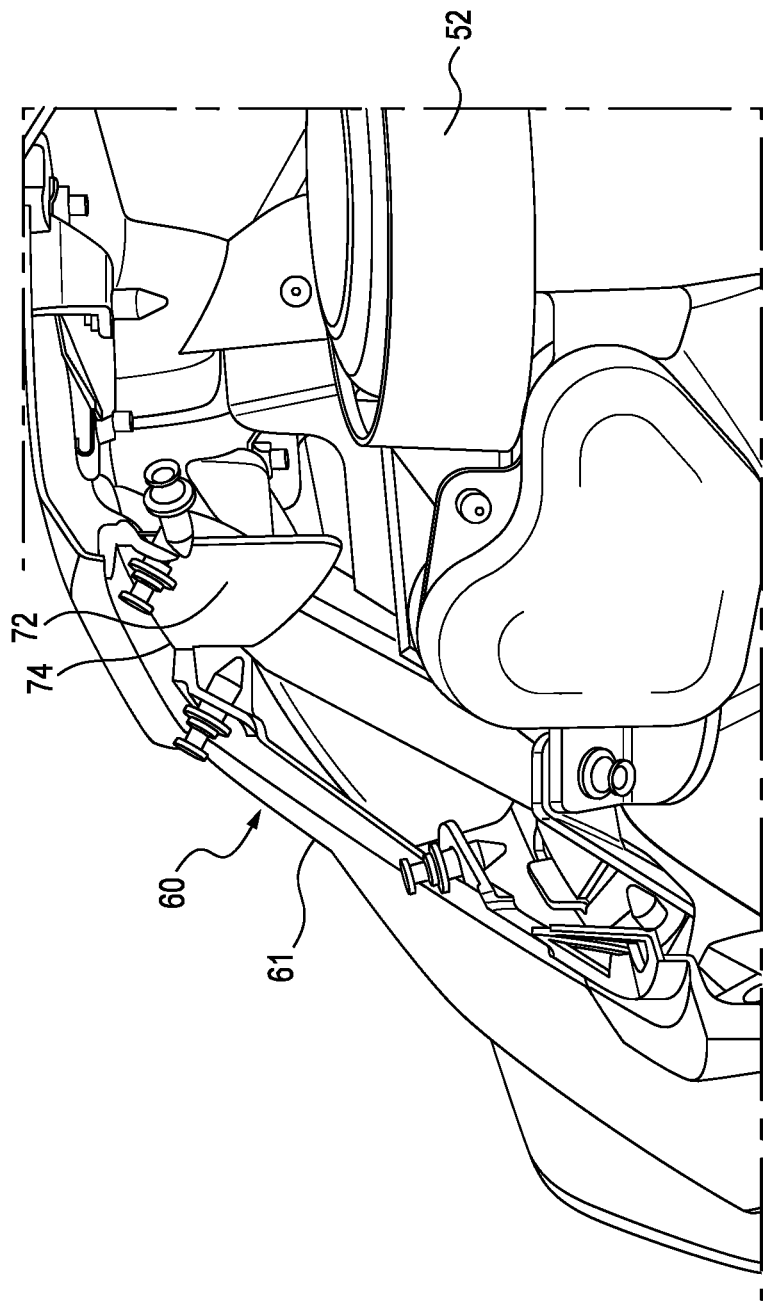
FIG. 7 is a front perspective view of the upper air intake vent of FIG. 6.
Figure 8:
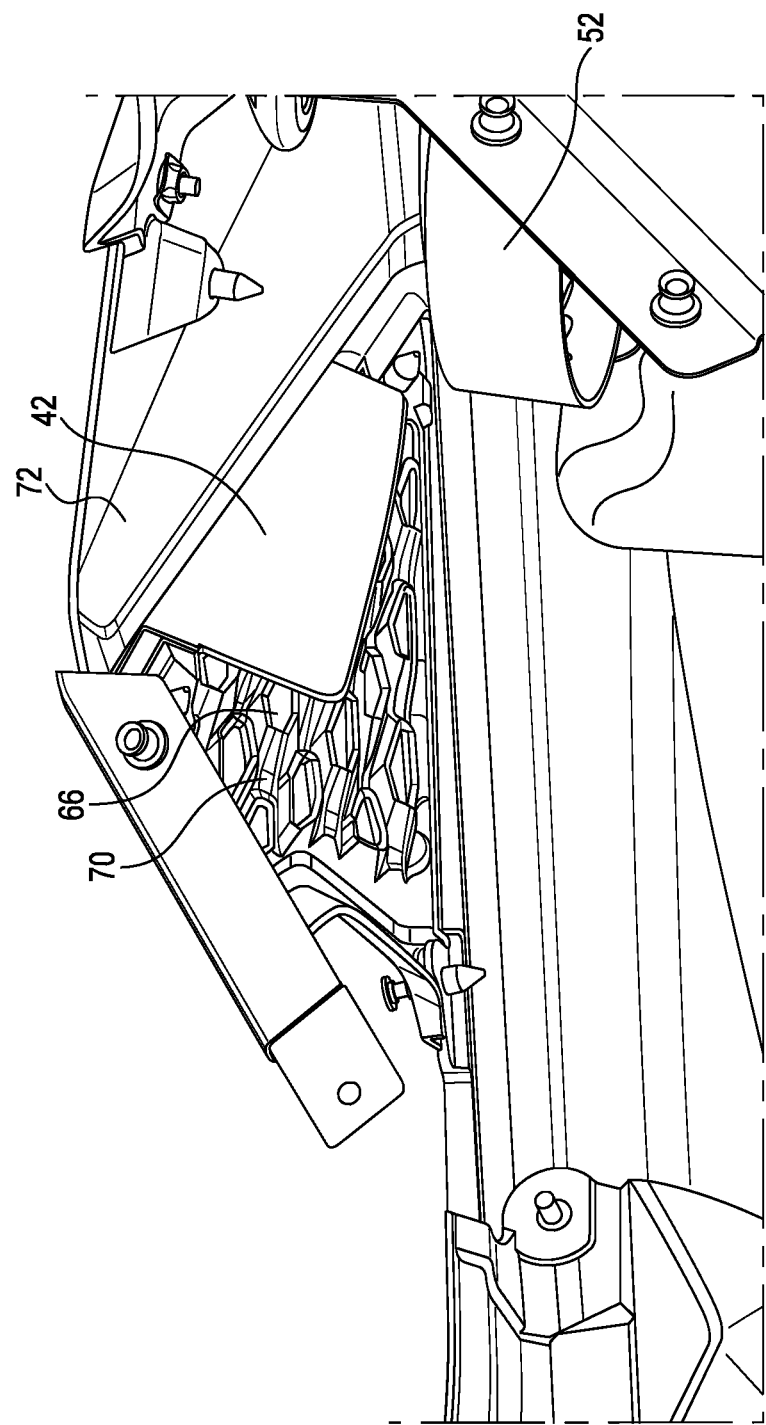
FIG. 8 is a back view of the upper air intake vent of FIG. 6.

As illustrated in FIGS. 6-8, one embodiment of the upper air intake vent 60 is described in greater detail. The upper air intake vent 60 may further include a snorkel protection flange 72 extending downwardly from an inner surface 74 of the fender body panel 43. In the illustrated embodiment, the snorkel protection flange 72 has a trapezoidal shape substantially similar to that of the trapezoidal-shaped opening 61 of the upper air intake vent 60. The snorkel protection flange 72 prevents any water or debris that passes through the mesh cover 70 from striking and damaging the snorkel 52. Water may enter the upper air intake vent 60 through operation of the motor vehicle 10, or from a hose or car wash (not shown) used to clean the motor vehicle 10.

Figure 9:
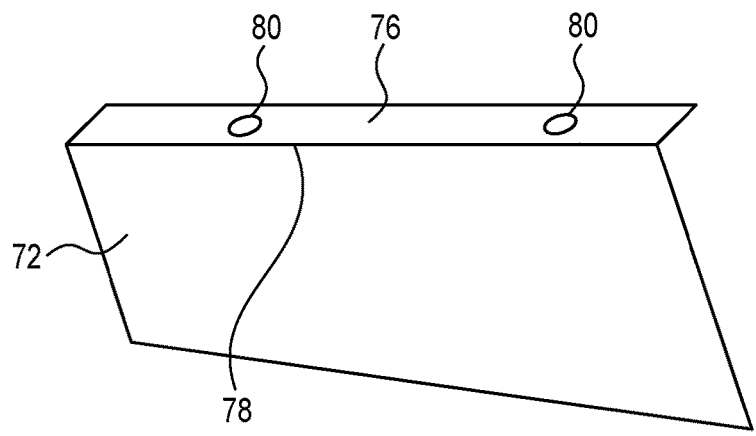
FIG. 9 is a side view of an alternate embodiment of a snorkel protection flange illustrated in FIGS. 6-8.

In one embodiment, the snorkel protection flange 72 may be integrally formed with the internal surface of the fender body panel 43. In an alternate embodiment, as illustrated in FIG. 9, the snorkel protection flange 72 may include a flange 76 extending from a connection edge 78 of the snorkel protection flange 72 that may be used to connect the snorkel protection flange 72 to the inner surface 74 of the fender body panel 43 by any suitable fastener 80 known to those skilled in the art, such as rivets, welds, adhesive, screws, nut and bolt fasteners, and the like.

Figure 10:
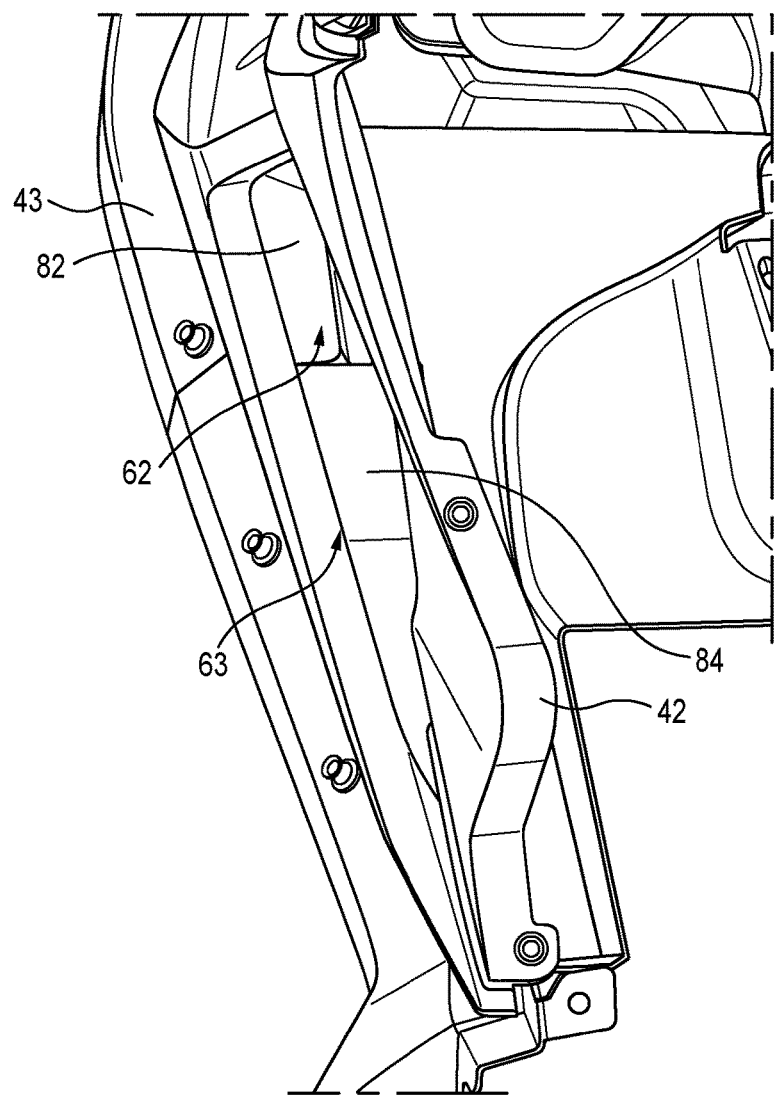
FIG. 10 is a front view of lower air intake vent of FIG. 5.
Figure 11:
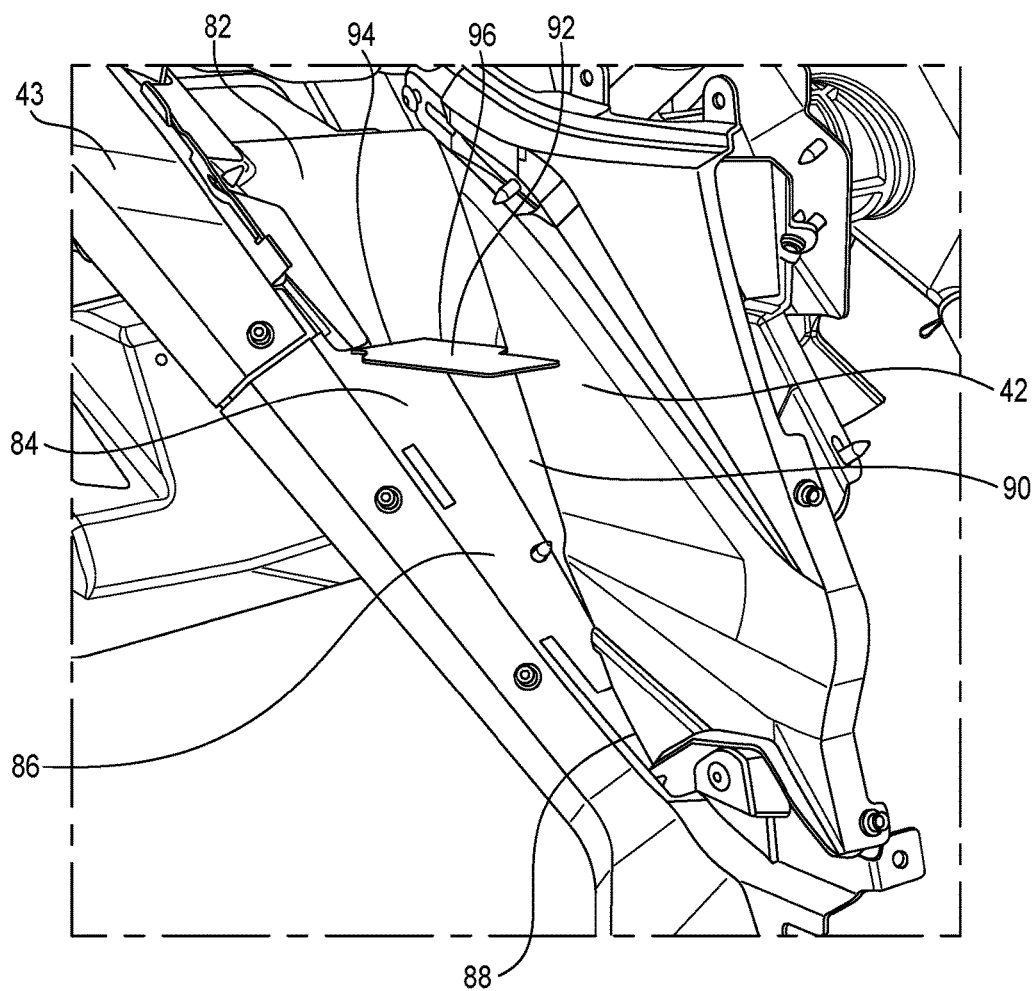
FIG. 11 is a side perspective view of the lower air intake vent of FIG. 10.
Figure 12:
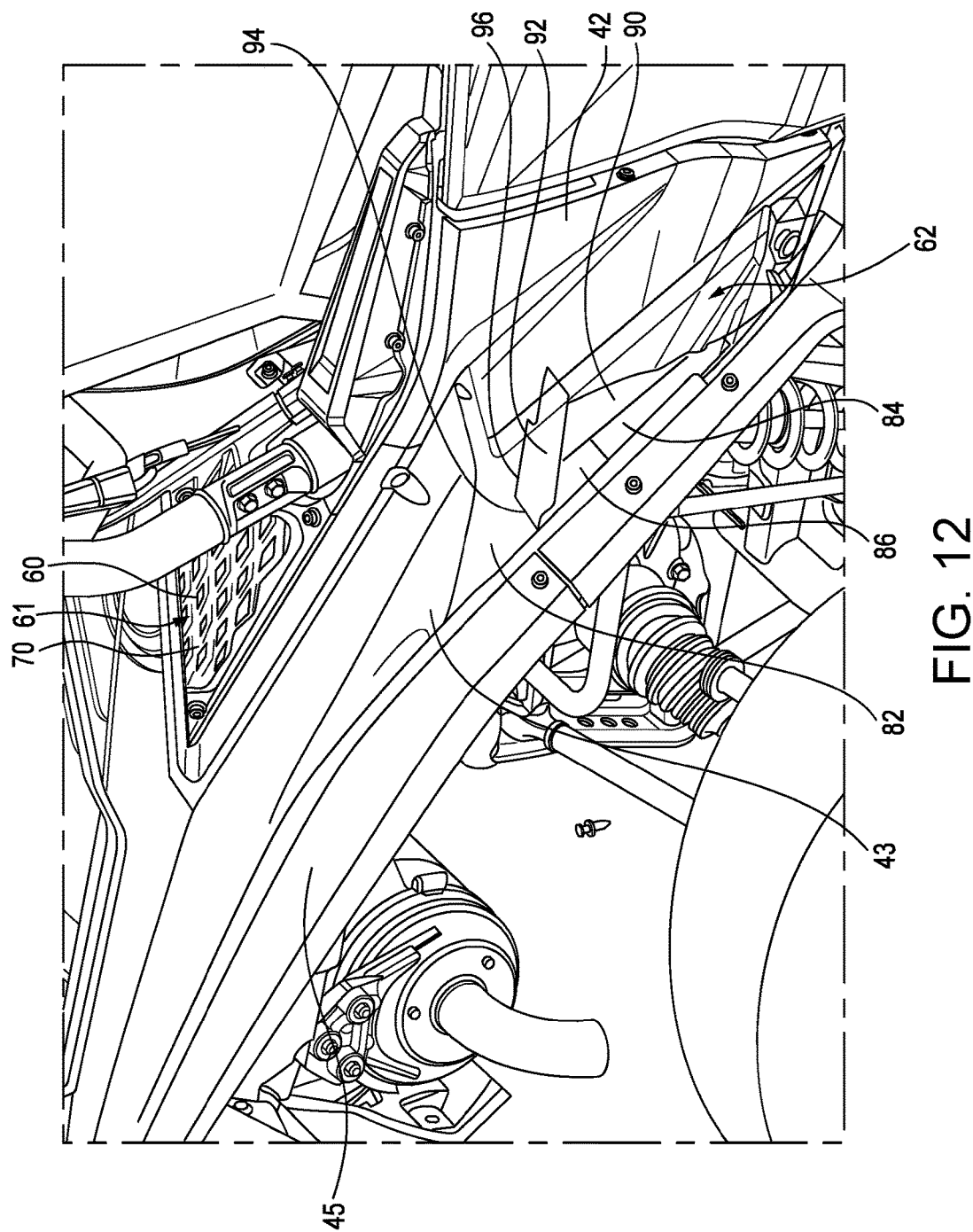
FIG. 12 is a side perspective view of the lower and upper air intake vents of the motor vehicle of FIG. 1.

As illustrated in FIGS. 10-12, the lower air intake vent 62 is described in greater detail. The lower air intake vent 62 is defined by an opening between the rear quarter body panel 42 and the fender body panel 43, which forms an air pathway 82 to the air intake compartment 56.

When motor vehicle 10 is operated in conditions such as snow, displaced snow may enter the lower air intake vent 62, thereby causing a blockage that reduce the flow of air to the air intake compartment 56. To combat such a blockage, a scoop 84 is located in the lower air intake vent 62 to prevent the accumulation of snow in the air pathway 82.

The scoop 84, illustrated in FIGS. 11-12, includes a base portion 86 attached to a body component 88 defining a back wall of the lower air intake vent 62, a longitudinally transverse portion 90 extending forward from the base portion 86 and adjacent or attached to the rear quarter body panel 42, and a laterally transverse portion 92 extending from an upper edge 94 of the base portion 86 and an upper edge 96 of the longitudinally transverse portion 90. The air pathway 82 is defined by the fender body panel 43, the laterally transverse portion 92 of the scoop 84, and the rear quarter body panel 42. While the laterally transverse portion 92 of the scoop 84 blocks snow or debris from coming up from the ground and entering the air pathway 82 where it may cause a blockage, air is allowed to freely pass into the air pathway 82 over the laterally transverse portion 92 of the scoop 84, where it then enters the air intake compartment 56. The scoop 84 may be constructed of any suitable material including, but not limited to, plastics, aluminum, steel, stainless steel, fiberglass, and the like known to those skilled in the art.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An air intake system for supplying air to a snorkel of a vehicle, the vehicle comprising a wheel well, a wheel disposed in the wheel well, a first body panel defining a side of an engine compartment of the vehicle, and a second body panel attached to the first body panel and located above and defining the wheel well, the air intake system comprising:
- a first air intake vent having a first opening and a snorkel located underneath the second body panel defining a first air pathway to the snorkel; and
- a scoop disposed in the first air intake vent, wherein air entering the first air intake vent passes the scoop and follows the first air pathway to the snorkel and wherein the scoop comprises:
  - a base portion attached to a body component defining a back wall of the lower air intake vent;
  - a longitudinally transverse portion extending forward from the base portion; and
  - a laterally transverse portion extending from an upper edge of the base portion and an upper edge of the longitudinally transverse portion; and
  - wherein air entering the first air intake vent passes the scoop and follows the first air pathway to the snorkel.

2. The air intake system of claim 1 wherein snow entering the first air intake vent is blocked and cycled out of the first air pathway by the laterally transverse portion of the scoop.

3. The air intake system of claim 2 wherein the first opening is located between the first body panel and the second body panel.

4. The air intake system of claim 3 further comprising:
- a second air intake vent having a second opening in the second body panel vertically above the wheel well, the second air intake vent defining a second air pathway to the snorkel; and
- a snorkel protection flange extending downwardly from an inner surface of the second body panel.

5. The air intake system of claim 4 wherein the snorkel protection flange prevents water or debris entering the second air intake vent from striking the snorkel.

6. The air intake system of claim 5 wherein the second air intake vent comprises:
- a mesh screen covering the second opening in the second body panel.

7. The air intake system of claim 6 wherein the snorkel protection flange is integrally formed with the second body panel.

8. An air intake system for supplying air to a snorkel of a vehicle, the vehicle comprising a wheel well, a wheel disposed in the wheel well, a first body panel defining a side of an engine compartment of the vehicle, and a second body panel attached to the first body panel and located above the wheel well, the air intake system comprising:
- a first air intake vent having a first opening in the second body panel vertically above the wheel well, the first air intake vent defining a first air pathway to the snorkel; and
- a snorkel protection flange extending downwardly from an inner surface of the second body panel.

9. The air intake system of claim 8 wherein the snorkel protection flange prevents water or debris entering the first air intake vent from striking the snorkel.

10. The air intake system of claim 9 wherein the first air intake vent further comprises:
- a mesh screen covering the first opening in the second body panel.

11. The air intake system of claim 10 wherein the snorkel protection flange is integrally formed with the second body panel.

12. The air intake system of claim 11 further comprising:
- a second air intake vent having a second opening, the second body panel defining a second air pathway to the snorkel; and
- a scoop disposed in the second air intake vent, the scoop having a base portion attached to a body component in the second air pathway, a longitudinally transverse portion extending forward from the base portion, and a laterally transverse portion extending from an upper edge of the base portion and an upper edge of the longitudinally transverse portion.

13. The air intake system of claim 12 wherein air entering the second air intake vent passes the scoop and follows the second air pathway to the snorkel.

14. The air intake system of claim 13 wherein snow entering the second air intake vent is blocked and cycled out of the second air pathway by the laterally transverse portion of the scoop.

15. The air intake system of claim 14 wherein the second opening is located between the first body panel and the second body panel.

16. An air intake system for supplying air to a snorkel of a vehicle, the vehicle comprising a wheel well, a wheel disposed in the wheel well, a rear quarter body panel defining a side of an engine compartment of the vehicle, and a fender body panel attached to the rear quarter body panel and located above the wheel well, the air intake system comprising:
- a lower air intake vent having a first opening defining a lower air pathway to the snorkel;
- a scoop disposed in the lower air intake vent, the scoop having a base portion attached to a body component in the lower air pathway, a longitudinally transverse portion extending forward from the base portion, and a laterally transverse portion extending from an upper edge of the base portion and an upper edge of the longitudinally transverse portion;
- an upper air intake vent having an upper opening in the fender body panel vertically above the wheel well, the upper air intake vent defining an upper air pathway to the snorkel; and
- a snorkel protection flange extending downwardly from an inner surface of the fender body panel.

17. The air intake system of claim 16 wherein:
- the snorkel protection flange prevents water or debris entering the upper air intake vent from striking the snorkel;
- air entering the lower air intake vent passes the scoop and follows the lower air pathway to the snorkel; and
- snow entering the lower air intake vent is blocked and cycled out of the lower air pathway by the laterally transverse portion of the scoop.

18. The air intake system of claim 17 wherein the first opening is located between the rear quarter body panel and the fender body panel.

19. The air intake system of claim 18 further comprising:
- a mesh screen covering the upper opening in the fender body panel; and
- wherein the snorkel protection flange is integrally formed with the fender body panel.

* * * * *